Sept. 29, 1931.  R. E. MANLEY  1,825,324
TREATING HYDROCARBON OILS
Filed Nov. 16, 1927
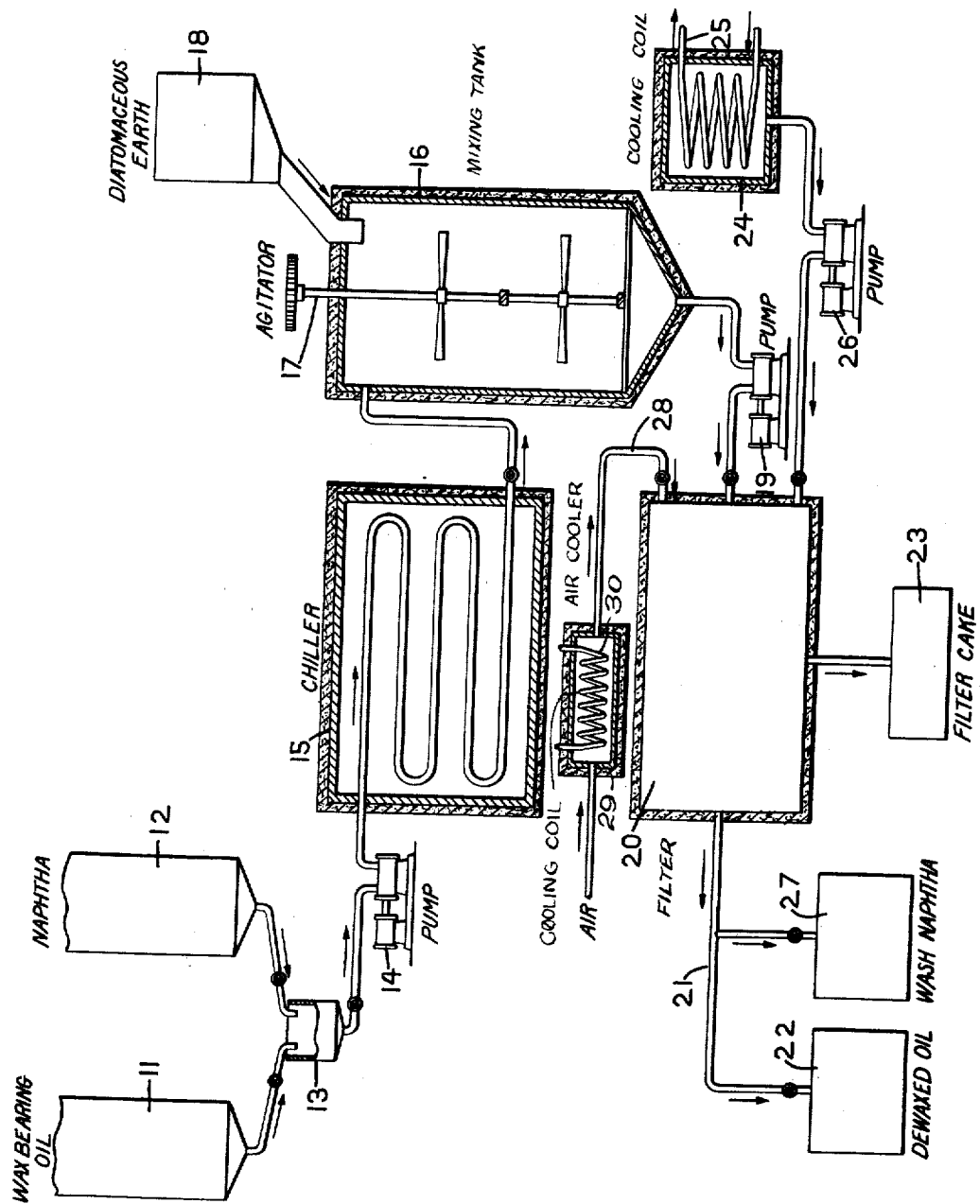

Patented Sept. 29, 1931

1,825,324

UNITED STATES PATENT OFFICE

ROBERT E. MANLEY, OF PORT ARTHUR, TEXAS, ASSIGNOR TO THE TEXAS COMPANY, OF NEW YORK, N. Y., A CORPORATION OF DELAWARE

TREATING HYDROCARBON OILS

Application filed November 16, 1927. Serial No. 233,565.

This invention relates to a process for treating hydrocarbon oils and more particularly relates to a process for treating hydrocarbon oils to effect removal of solid and semi-solid waxy constituents whereby the temperature of congelation of the oil is reduced. Considered broadly, the invention comprises a process wherein hydrocarbon oil, which may have been subjected to any desired preliminary refining treatment, is chilled to a temperature which will effect precipitation of solid or semi-solid waxy constituents after which the precipitated constituents are separated from the oil by filtration at temperatures below their precipitation temperature. To aid in the separation of waxy constituents from the oil a comminuted solid material is mixed with the oil, the comminuted solid and the precipitated wax being deposited together upon the filter. After the deposition of the waxy constituents and the comminuted solid upon the filter in the form of a cake, an oil solvent is forced through the cake while it remains on the filter for the purpose of displacing all of the oil therefrom, the solvent and the wax cake being maintained at such a comparatively low temperature that no substantial quantity of wax may become dissolved in the solvent.

In the separation of waxy constituents from hydrocarbon oils derived from crude petroleum the customary procedure, in the case of crystalline waxes contained in the less viscous distillate oils which have been subjected to a certain amount of cracking during distillation, involves chilling the oil to a low temperature to effect precipitation of the wax after which the oil is separated from the precipitate by filtration. In dewaxing the more viscous residual oils and those distillate oils which have not been subjected to any appreciable amount of cracking during distillation it is found that this simple process of chilling and filtering is not practical due to the nature of the wax contained in oils of this type. Such wax is less crystalline than that found in distillate oils which have been subjected to a slight amount of cracking and it is usually referred to in the refining industry as "amorphous" wax. When deposited upon a filter, wax of this type produces a dense gummy cake which is of such nature as to make economic rates of filtration and efficient separation impractical. For the separation of waxes of this nature the customary procedure involves diluting the oil to reduce its viscosity, chilling until the wax is precipitated and then separating the oil from the precipitated wax in a centrifuge or by settling under the influence of gravity over long periods of time.

Comparatively recently it has been discovered that viscous hydrocarbon oils containing wax or poor filtering characteristics may be efficiently dewaxed by chilling to effect precipitation of the wax and then filtering in the presence of a comminuted solid material such for example as diatomaceous earth. During filtration the comminuted solid and the precipitated wax are deposited together upon the filter, thus forming a porous filter cake which effects satisfactory separation of the oil and wax and enables filtration to be carried on at rates which are economical from a practical standpoint. Such a process is described in detail in U. S. Patent No. 1,509,325, issued September 23, 1924 to James W. Weir and Wm. J. Ryan.

The present invention consists of a process of the type in which chilled hydrocarbon oil is dewaxed by filtration in the presence of a comminuted solid material but which is a distinct improvement over the methods of procedure heretofore known and practiced in connection with other processes of this kind. One of the more important advantages of the process is the thorough separation of oil and wax which is accomplished under economical conditions of operation. Another important advantage of the process having considerable bearing upon its practicability from an economic standpoint is that the procedure specified improves operating conditions with respect to the filtration step to such a degree as to produce economy in operation and greatly improves the actual mechanism of the filtration process. Thus, in carrying on dewaxing by filtration without including the step comprising the present invention, it is practically impossible to produce upon the filtering surface a cake which may be cleanly and quickly separated and discharged. However, by the practice of the present invention a filter cake is produced consisting of wax and the comminuted solid material used as an aid in filtering which is substantially dry and, due to the fact that it adheres only very lightly to the filtering surface, may be easily and completely removed therefrom.

The invention may be readily understood from a description of the procedure considered in connection with the accompanying drawing which represents a more or less diagrammatic elevation partly in section of an apparatus which may be employed for carrying on the various steps of the process. The apparatus illustrated in the drawing is shown and described merely for the purpose of aiding in understanding the process and it is to be understood that any other suitable apparatus may be substituted for that shown.

Referring to the drawing, there is supplied a source of oil to be dewaxed such as the tank 11 and a source of a suitable diluent, for example naphtha, such as the tank 12. A mixing tank 13 is provided wherein the wax-bearing oil and diluent may be mixed if so desired. From the mixing tank 13 the wax-bearing oil, which may be or may not be diluted, is forced by means of the pump 14 through the chiller 15. The chiller may be of any suitable design and is preferably of the tubular type in which the oil passes through a pipe surrounded by a jacket in which cold brine flows in a direction counter current to the flow of the oil. After having been chilled to the proper temperature to effect precipitation of the waxy constituents the oil is directed to the insulated mixing tank 16, fitted with a suitable mechanical stirring or agitating device 17, wherein it is thoroughly mixed with the proper quantity of a comminuted solid material, for example diatomaceous earth, supplied from the hopper 18. From the mixing tank 16 the mixture of chilled oil and diatomaceous earth is forced by the pump 19 through the filter press 20, which is heavily insulated in order to maintain the chilled oil at a low temperature. The filter press may be of any suitable type and it has been found from experience that the type of pressure filter known as the Kelly filter is quite satisfactory for this work.

The oil passes through the filter and is discharged through the connection at 21 into the storage tank 22 while the precipitated wax and diatomaceous earth are deposited upon the filtering surface. A container 23 is supplied to receive the cake of wax and diatomaceous earth which may be periodically dumped from the filter. A source of supply for cold naphtha is provided, as the insulated tank 24, equipped with a means for chilling such as a cooling coil 25, and a pump 26 is provided for forcing the cold naphtha through the filter for washing oil from the cake of wax and diatomaceous earth. A tank 27 with suitable connections is provided for receiving the naphtha after it has been used in washing the filter cake. A connection 28 is supplied the filter press from a source of compressed air which is used in displacing liquid from the filter cake. The air may preferably pass through a cooling drum 29 where it is cooled by contact with a cooling coil 30 through which cold brine is circulated.

The operation of the process in connection with the apparatus shown may be substantially as follows:

The oil to be dewaxed, say for example a treated and filtered cylinder stock, is introduced from the tank 11 into the mixing tank 13 where it is thoroughly mixed with a suitable diluent, preferably petroleum naphtha, in proportion of about 30 to 60 per cent by volume of the diluent. The diluted oil is then forced through the chiller 15 by means of the pump 14 and the temperature is reduced to the degree desired to effect precipitation of the solid and semi-solid waxy constituents contained therein. The temperature to which the diluted stock is chilled will depend somewhat upon the degree of dewaxing which it is desired to obtain, which is in turn dependent upon the maximum temperature of congelation desired in the finished oil, and in general it may be said that the oil should be chilled to a temperature several degrees lower than the lower limit of the congelation temperature desired in the finished dewaxed oil. In the present instance it may be considered that the dewaxed cylinder stock should have a "pour test" or a congelation temperature not exceeding approximately 30° F. in which case it will be desirable to chill the diluted stock to about 15 to 25° F.

From the chiller 15 the diluted stock passes into the mixing tank 16 where it is mixed with diatomaceous earth in suitable proportion, in this instance about 10 to 30 pounds of earth to each barrel of diluted stock. The diatomaceous earth is very finely powdered and the contents of the tank 16 are continuously agitated by the mechanical means 17 to prevent settling of the precipitated wax and the diatomaceous earth. From the tank 16 diluted oil containing precipitated waxy constituents and diatomaceous earth in suspension is forced through the filter 20. The dewaxed oil is discharged from the filter through suitable connections at 21 and passes to the storage tank 22 after which it may be treated in any suitable manner for the removal of the diluent to yield the finished dewaxed product.

The precipitated wax and diatomaceous earth are retained on the filtering surfaces and form a porous cake thereon. When the proper thickness of cake has been built up on the filter, evidenced by the increased pressure required to force the oil through the cake, the supply of oil from the tank 16 is cut off and the filter drained. Cool compressed air or any other suitable gas, such for example as hydrogen still gases which may be available, is then turned into the filter through the connection 28, which serves to displace a portion of the oil remaining in the filter cake. It is desirable that the temperature of the air be reduced as much as is economically possible in order that there will be no tendency for the wax cake to increase in temperature and thus dissolve somewhat in the oil. Following this procedure the compressed air is released from the filter and an oil solvent, preferably petroleum naphtha, is pumped from the tank 24 by means of the pump 26, through the filter. The naphtha is cooled to such a low temperature as to prevent its dissolving any substantial portion of the wax deposited on the filter and accordingly, as the naphtha passes through the filter cake it displaces and dissolves therefrom the oil which was not removed by the treatment with compressed air. The washing naphtha, carrying with it the final traces of oil which remained in the filter cake, passes from the filter through the connection at 21 into the tank 27 and may be recovered by distillation for further use. However, a more desirable method of handling this material may be to use it for the purpose of diluting the original wax-bearing stock and, accordingly the contents of the tank 27 may be transferred to the tank 12.

Oil solvents other than petroleum naphtha, for example coal tar products such as benzol, may be used for the purpose of displacing oil from the wax cake, but from an economic standpoint, petroleum naphtha having a boiling range within ordinary gasoline specifications has been found most satisfactory.

After the washing with cold naphtha the cake may be blown with cool compressed air to displace the naphtha remaining therein, providing a dry filter cake of wax and diatomaceous earth which is easily separated from the filtering surfaces. The filter may then be dumped and the filter cake transferred to the container 23, where it may be treated with a warm solvent or by other means for the separation of wax from the diatomaceous earth, after which the earth may be returned to the container 17 and used again in dewaxing further stock.

The foregoing description has referred to a specific example of a process embodying the invention applied to the dewaxing of a particular product. However, it is not intended that the invention shall be limited in any way by the example and it should be understood that the process may be applied to the various types of wax-bearing hydrocarbon oils, either crude, or distillate or residual oils derived therefrom, containing either crystalline or amorphous paraffin wax.

Obviously many modifications and variations of the invention, as hereinbefore set forth, may be made without departing from the spirit and scope thereof, and therefore, only such limitations should be imposed as are indicated in the appended claims.

I claim:

1. The process of separating wax from hydrocarbon oil which comprises chilling the oil to effect precipitation of solid and semi-solid waxy constituents, mixing a comminuted solid material with the chilled oil, separating said comminuted solid and the precipitated waxy constituents from the bulk of the oil by filtration under pressure whereby a porous cake of wax and comminuted solid material is deposited upon the filter, displacing a portion of the oil absorbed in the material deposited upon the filter by forcing a cool gas therethrough and then forcing an oil solvent through the material deposited on the filter at such temperature that no substantial quantity of the waxy constituents may be dissolved therein whereby a substantially complete separation of oil from the waxy constituents is obtained.

2. The process of separating wax from hydrocarbon oil which comprises chilling the oil to effect precipitation of solid and semi-solid waxy constituents, mixing a comminuted solid material with the chilled oil, separating said comminuted solid and the precipitated waxy constituents from the bulk of the oil by filtration under pressure whereby a porous cake of wax and comminuted solid material is deposited upon the filter, displacing a portion of the oil absorbed in the material deposited upon the filter by forcing a cool gas therethrough, forcing an oil solvent through the material deposited on the filter at such temperature that no substantial quantity of the waxy constituents may be dissolved therein and then displacing the solvent from the material deposited upon the filter by means of a cool gas whereby a substantially complete separation of oil from the waxy constituents is obtained.

3. The process of separating wax from hydrocarbon oil which comprises diluting the oil with a solvent, chilling the dilute solution to effect precipitation of wax constituents, forcing the chilled oil through a filter whereby the wax is deposited upon the filter in the form of a cake, then forcing a cool gas through the filter cake, and thereafter forcing a quantity of the same solvent used in the original dilution of the oil while cool through the filter cake whereby a substantially complete separation of oil from the wax constituents is obtained.

4. In a process of separating wax from hydrocarbon oil involving the filtration of precipitated wax from a naphtha solution of the chilled oil in the presence of a comminuted solid material, the procedure which comprises separating residual oil from the mixture of wax and comminuted solid material deposited as a cake upon the filter by first forcing a cool gas through the filter cake, and then forcing cool naphtha therethrough.

In witness whereof I have hereunto set my hand and seal this 1st day of November, 1927.

ROBERT E. MANLEY.

filter whereby the wax is deposited upon the filter in the form of a cake, then forcing a cool gas through the filter cake, and thereafter forcing a quantity of the same solvent used in the original dilution of the oil while cool through the filter cake whereby a substantially complete separation of oil from the wax constituents is obtained.

4. In a process of separating wax from hydrocarbon oil involving the filtration of precipitated wax from a naphtha solution of the chilled oil in the presence of a comminuted solid material, the procedure which comprises separating residual oil from the mixture of wax and comminuted solid material deposited as a cake upon the filter by first forcing a cool gas through the filter cake, and then forcing cool naphtha therethrough.

In witness whereof I have hereunto set my hand and seal this 1st day of November, 1927.

ROBERT E. MANLEY.

CERTIFICATE OF CORRECTION.

Patent No. 1,825,324.   Granted September 29, 1931, to

ROBERT E. MANLEY.

It is hereby certified that error appears in the printed specification of the above numbered patent requiring correction as follows: Page 1, line 26, after the word "placing" insert the word substantially; and that the said Letters Patent should be read with this correction therein that the same may conform to the record of the case in the Patent Office.

Signed and sealed this 3rd day of May, A. D. 1932.

(Seal)

M. J. Moore,
Acting Commissioner of Patents.

CERTIFICATE OF CORRECTION.

Patent No. 1,825,324.             Granted September 29, 1931, to

ROBERT E. MANLEY.

It is hereby certified that error appears in the printed specification of the above numbered patent requiring correction as follows: Page 1, line 26, after the word "placing" insert the word substantially; and that the said Letters Patent should be read with this correction therein that the same may conform to the record of the case in the Patent Office.

Signed and sealed this 3rd day of May, A. D. 1932.

(Seal)                                             M. J. Moore,
                                                     Acting Commissioner of Patents.